United States Patent
Chen et al.

(10) Patent No.: US 8,977,669 B2
(45) Date of Patent: Mar. 10, 2015

(54) MULTI-INPUT AND BINARY REPRODUCIBLE, HIGH BANDWIDTH FLOATING POINT ADDER IN A COLLECTIVE NETWORK

(75) Inventors: Dong Chen, Yorktown Heights, NY (US); Noel A. Eisley, Wappingers Falls, NY (US); Philip Heidelberger, Yorktown Heights, NY (US); Burkhard Steinmacher-Burow, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 12/684,776

(22) Filed: Jan. 8, 2010

(65) Prior Publication Data

US 2011/0173421 A1    Jul. 14, 2011

(51) Int. Cl.
G06F 7/38 (2006.01)
G06F 9/30 (2006.01)
G06F 9/38 (2006.01)

(52) U.S. Cl.
CPC .......... *G06F 9/30014* (2013.01); *G06F 9/3885* (2013.01)
USPC ....................................... 708/495

(58) Field of Classification Search
None
See application file for complete search history.

(56) References Cited

U.S. PATENT DOCUMENTS

| 5,673,407 | A | * | 9/1997 | Poland et al. ................ 712/222 |
| 5,995,122 | A | * | 11/1999 | Hsieh et al. .................. 345/561 |
| 6,247,116 | B1 | * | 6/2001 | Abdallah et al. ............. 712/221 |
| 2001/0051969 | A1 | * | 12/2001 | Oberman et al. ............ 708/514 |
| 2003/0206173 | A1 | * | 11/2003 | Kawai et al. ................. 345/558 |
| 2004/0071041 | A1 | * | 4/2004 | Aldrich et al. ............... 365/232 |
| 2004/0073590 | A1 | * | 4/2004 | Bhanot et al. ................ 708/534 |
| 2007/0242085 | A1 | * | 10/2007 | Weybrew et al. ............. 345/629 |

* cited by examiner

*Primary Examiner* — Henry Tsai
*Assistant Examiner* — Aurangzeb Hassan
(74) *Attorney, Agent, or Firm* — Scully, Scott, Murphy & Presser, P.C.; Daniel P. Morris, Esq.

(57) ABSTRACT

To add floating point numbers in a parallel computing system, a collective logic device receives the floating point numbers from computing nodes. The collective logic devices converts the floating point numbers to integer numbers. The collective logic device adds the integer numbers and generating a summation of the integer numbers. The collective logic device converts the summation to a floating point number. The collective logic device performs the receiving, the converting the floating point numbers, the adding, the generating and the converting the summation in one pass. One pass indicates that the computing nodes send inputs only once to the collective logic device and receive outputs only once from the collective logic device.

10 Claims, 4 Drawing Sheets

MULTI-INPUT AND BINARY REPRODUCIBLE, HIGH BANDWIDTH FLOATING POINT ADDER IN A COLLECTIVE NETWORK

GOVERNMENT CONTRACT

This invention was Government support under Contract No. B554331 awarded by Department of Energy. The Government has certain rights in this invention.

CROSS-REFERENCE TO RELATED APPLICATIONS

The present invention is related to the following commonly-owned, co-pending United States Patent Applications filed on even date herewith, the entire contents and disclosure of each of which is expressly incorporated by reference herein as if fully set forth herein. U.S. Pat. No. 8,275,954 issued Sep. 25, 2012; U.S. Pat. No. 8,275,964 issued Sep. 25, 2012; U.S. patent application Ser. No. 12/684,190 filed Jan. 8, 2010; U.S. Pat. No. 8,468,275 issued Jun. 18, 2013; U.S. Pat. No. 8,347,001 issued Jan. 1, 2013; U.S. Pat. No. 8,949,539 issued Feb. 3, 2015; U.S. Pat. No. 8,595,389 issued Nov. 26, 2013; U.S. Pat. No. 8,103,910 issued Jan. 24, 2012; U.S. Pat. No. 8,447,960 issued May 21, 2013; U.S. Pat. No. 8,268,389 issued Sep. 18, 2012; U.S. Pat. No. 8,359,404 issued Jan. 22, 2013; U.S. patent application Ser. No. 12/684,852 filed Jan. 8, 2010; U.S. Pat. No. 8,429,377 issued Apr. 23, 2013; U.S. Pat. No. 8,356,122 issued Jan. 15, 2013; U.S. Pat. No. 8,868,837 issued Oct. 21, 2014; U.S. Pat. No. 8,473,683 issued Jun. 25, 2013; U.S. Pat. No. 8,458,267 issued Jun. 4, 2013; U.S. Pat. No. 8,086,766 issued Dec. 27, 2011; U.S. Pat. No. 8,571,834 issued Oct. 29, 2013; U.S. patent application Ser. No. 13/004,007 filed Jan. 10, 2011; U.S. Pat. No. 8,533,399 issued Sep. 10, 2013; U.S. Pat. No. 8,621,478 issued Dec. 31, 2013; U.S. Pat. No. 8,751,748 issued Jun. 10, 2014; U.S. Pat. No. 8,838,906 issued Sep. 16, 2014; U.S. Pat. No. 8,832,415 issued Sep. 9, 2014; U.S. Pat. No. 8,255,633 issued Aug. 28, 2012; U.S. Pat. No. 8,347,039 issued Jan. 1, 2013; U.S. Pat. No. 8,788,879 issued Jul. 22, 2014; U.S. Pat. No. 8,359,367 issued Jan. 22, 2013; U.S. Pat. No. 8,327,077 issued Dec. 4, 2012; U.S. Pat. No. 8,364,844 issued Jan. 29, 2013; U.S. Pat. No. 8,549,363 issued Oct. 1, 2013; U.S. Pat. No. 8,571,847 issued Oct. 29, 2013; U.S. Pat. No. 8,782,164 issued Jul. 15, 2014; U.S. patent application Ser. No. 13/008,546 filed Jan. 18, 2011; U.S. patent application Ser. No. 12/697,175 filed Jan. 29, 2010; U.S. Pat. No. 8,370,551 issued Feb. 5, 2013; U.S. Pat. No. 8,312,193 issued Nov. 13, 2012; U.S. Pat. No. 8,521,990 issued Aug. 27, 2013; U.S. Pat. No. 8,412,974 issued Apr. 2, 2013; U.S. Pat. No. 8,832,403 issued Sep. 9, 2014; U.S. patent application Ser. No. 12/796,389 filed Jun. 8, 2010; U.S. Pat. No. 8,713,294 issued Apr. 29, 2014; U.S. Pat. No. 8,527,740 issued Sep. 3, 2013; and U.S. Pat. No. 8,595,554 issued Nov. 26, 2013.

BACKGROUND

The present invention generally relates to a parallel computing system. More particularly, the present invention relates to adding a plurality of floating point numbers in the parallel computing system.

IEEE 754 describes floating point number arithmetic. Kahan, "IEEE Standard 754 for Binary Floating-Point Arithmetic," May 31, 1996, UC Berkeley Lecture Notes on the Status of IEEE 754, wholly incorporated by reference as if set forth herein, describes IEEE Standard 754 in detail.

According to IEEE Standard 754, to perform floating point number arithmetic, some or all floating point numbers are converted to binary numbers. However, the floating point number arithmetic does not need to follow IEEE or any particular standard. Table 1 illustrates IEEE single precision floating point format.

TABLE 1

| IEEE single precision floating point number format | | |
|---|---|---|
| Signed (S) | Exponent (E) | Mantissa (M) |
| 0 | 1          8 | 9                                    31 |

"Signed" bit indicates whether a floating point number is a positive (S=0) or negative (S=1) floating point number. For example, if the signed bit is 0, the floating point number is a positive floating point number. "Exponent" field (E) is represented by a power of two. For example, if a binary number is $10001.001001_2 = 1.0001001001_2 \times 2^4$, then E becomes $127+4=131_{10}=1000\_0011_2$. "Mantissa" field (M) represents fractional part of a floating point number.

For example, to add $2.5_{10}$ and $4.75_{10}$, $2.5_{10}$ is converted to 0x40200000 (in hexadecimal format) as follows:

Convert $2_{10}$ to a binary number $10_2$, e.g., by using binary division method.

Convert $0.5_{10}$ to a binary number $0.1_2$, e.g., by using multiplication method.

Calculate the exponent and mantissa fields: $10.1_2$ is normalized to $1.01_2 \times 2^1$. Then, the exponent field becomes $128_{10}$, i.e., $127+1$, which is equal to $1000\_0000_2$. The mantissa field becomes $010\_0000\_0000\_0000\_0000_2$. By combining the signed bit, the exponent field and the mantissa field, a user can obtain $0100\_00000010\_0000\_0000\_0000\_0000\_0000_2 = $0x40200000.

Similarly, the user covert $4.75_{10}$ to 0x40980000.

Add 0x40200000 and 0x40980000 as follows:

Determine values of the fields.
  i. $2.5_{10}$
     S: 0
     E: $1000\_0000_2$
     M: $1.01_2$
  ii. $4.75_{10}$
     S: 0
     E: $1000\_0001_2$
     M: $1.0011_2$ Adjust a number with a smaller exponent to have a maximum exponent (i.e., largest exponent value among numbers; in this example, $1000\_0001_2$). In this example, $2.5_{10}$ is adjusted to have $1000\_0001_2$ in the exponent field. Then, the mantissa field of $2.5_{10}$ becomes $0.101_2$.

Add the mantissa fields of the numbers. In this example, add $0.101_2$ and $1.0011_2$.

Then, append the exponent field. Then, in this example, a result becomes $0100\_0000\_1110\_1000\_0000\_0000\_0000\_0000_2$.

Convert the result to a decimal number. In this example, the exponent field of the result is $1000\_0001_2=129_{10}$. By subtracting $127_{10}$ from $129_{10}$, the user obtains $2_{10}$. Thus, the result is represented by $1.1101_2 \times 2^2 = 111.01_2$. $111_2$ is equal to $7_{10}$. $0.01_2$ is equal to $0.25_{10}$. Thus, the user obtains $7.25_{10}$.

Although this example is based on single precision floating point numbers, the mechanism used in this example can be extended to double precision floating point numbers. A double precision floating number is represented by 64 bits, i.e., 1 bit for the signed bit, 11 bits for the exponent field and 52 bits for the mantissa field.

Traditionally, in a parallel computing system, floating point number additions in multiple computing node operations, e.g., via messaging, are done in part, e.g., by software. The additions require at per network hop a processor to first receive multiple network packets associated with multiple messages involved in a reduction operation. Then, the processor adds up floating point numbers included in the packets, and finally puts the results back into the network for processing at the next network hop. An example of the reduction operations is to find a summation of a plurality of floating point numbers contributed (i.e., provided) from a plurality of computing nodes. This software had large overhead, and could not utilize a high network bandwidth (e.g., 2 GB/s) of the parallel computing system.

Therefore, it is desirable to perform the floating point number additions in a collective logic device to reduce the overhead and/or to fully utilize the network bandwidth.

SUMMARY OF THE INVENTION

The present invention describes a system, method and computer program product for implementing a hardware logic device in a parallel computing system for adding floating point numbers.

In one embodiment, there is provided a method for adding a plurality of first floating point numbers in a parallel computing system, the parallel computing system including a plurality of computing nodes, a computing node including at least one processor and at least one memory device, the method comprising:

receiving a plurality of the first floating point numbers from the computing nodes or network links;

converting the first floating point numbers to integer numbers;

adding the integer numbers and generating a summation of the integer numbers; and converting the summation to a second floating point number, wherein the receiving, the converting the first floating point numbers, the adding, the generating and the converting the summation are done in one pass, the one pass indicating that the computing nodes send inputs only once to a collective logic device and receive outputs only once from the collective logic device.

In one embodiment, there is provided a parallel computing system for adding a plurality of first floating point numbers, the system comprising:

a plurality of computing nodes, a computing node including at least one processor and at least one memory device; and
    a collective logic device including:
        a front-end logic device for receiving the first floating point numbers from the computing nodes or network links and for converting the first floating point numbers to integer numbers;
        an ALU for adding the integer numbers and generating a summation of the integer numbers; and
        a back-end logic device for converting the summation to a second floating point number,
    wherein the receiving, the converting the first floating point numbers, the adding, the generating and the converting the summation are done in one pass, the one pass indicating that the computing nodes send inputs only once to the collective logic device and receive outputs only once from the collective logic.

In a further embodiment, the collective logic device further includes:
    a floating number exponent max unit for determining a maximum exponent of the first floating point numbers In a further embodiment, the collective logic device is implemented in a network.

In a further embodiment, the second floating point number is reproducible.

BRIEF DESCRIPTION OF THE DRAWINGS

The accompanying drawings are included to provide a further understanding of the present invention, and are incorporated in and constitute a part of this specification. The drawings illustrate embodiments of the invention and, together with the description, serve to explain the principles of the invention. In the drawings.

DETAILED DESCRIPTION

In one embodiment, the present disclosure illustrates performing floating point number additions in hardware, for example, to reduce the overhead and/or to fully utilize the network bandwidth.

Figure 2:
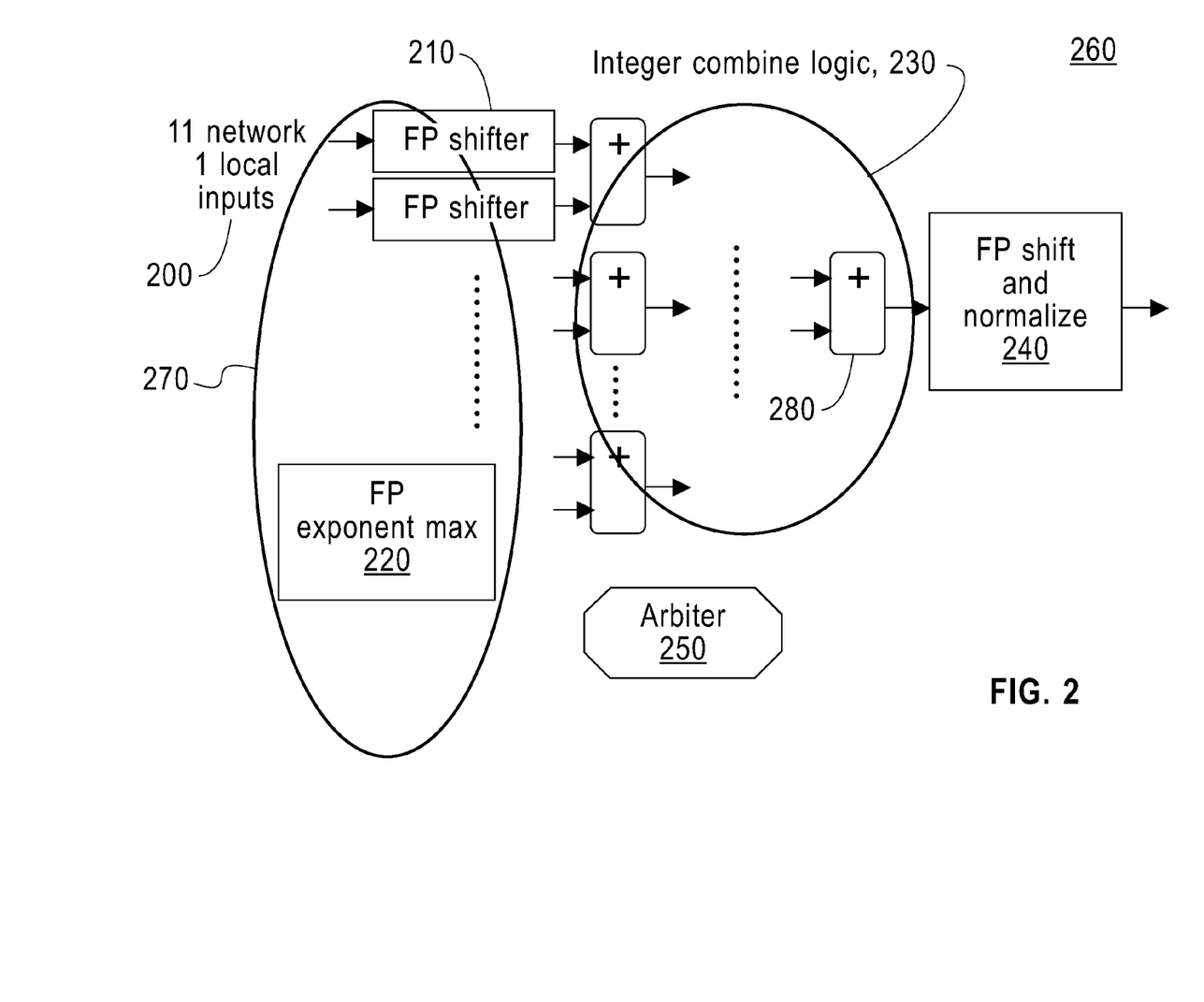
FIG. 2 illustrates a system diagram of a collective logic device in one embodiment.

FIG. 2 illustrates a collective logic device 260 for adding a plurality of floating point numbers in a parallel computing system (e.g., IBM® Blue Gene® Q). As shown in FIG. 2, the collective logic device 260 comprises, without restriction, a front-end floating point logic device 270, an integer ALU (Arithmetic Logic Unit) tree 230, a back-end floating point logic device 240. The front-end floating point logic device 270 comprises, without limitation, a plurality of floating point number ("FP") shifters (e.g., FP shifter 210) and at least one FP exponent max unit 220. In one embodiment, the FP shifters 210 are implemented by shift registers performing a left shift(s) and/or right shift(s). The at least one FP exponent max unit 220 finds the largest exponent value among inputs 200 which are a plurality of floating point numbers. In one embodiment, the FP exponent max unit 220 includes a comparator to compare exponent fields of the inputs 200. In one embodiment, the collective logic device 260 receives the inputs 200 from network links, computing nodes and/or I/O links. In one embodiment, the FP shifters 210 and the FP exponent max unit 220 receive the inputs 200 in parallel from network links, computing nodes and/or I/O links. In another embodiment, the FP shifters 210 and the FP exponent max unit 220 receive the inputs 200 sequentially, e.g., the FP shifters 210 receives the inputs 200 and forwards the inputs 200 to the FP exponent max unit 220. The ALU tree 230 performs integer arithmetic and includes, without limitations, adders (e.g., an adder 280). The adders may be known adders including, without limitation, carry look-ahead adders, full adders, half adders, carry-save adders, etc. This ALU tree 230 is used for floating point arithmetic as well as integer arithmetic. In one embodiment, the ALU tree 230 is divided by a plurality of layers. Multiple layers of the ALU tree 230 are instantiated to do integer operations over (intermediate) inputs. These integer operations include, but are not limited to: integer signed and unsigned addition, max (i.e., finding a maximum integer number among a plurality of integer numbers), min (i.e., finding a minimum integer number among a plurality of integer numbers), etc.

In one embodiment, the back-end floating point logic device 240 includes, without limitation, at least one shift register for performing normalization and/or shifting operation (e.g., a left shift, a right shift, etc.). In embodiment, the collective logic device 260 further includes an arbiter device 250. The arbiter device is described in detail below in conjunction with FIG. 3. In one embodiment, the collective logic device 260 is fully pipelined. In other words, the collective logic device 260 is divided by stages, and each stage concurrently operates according to at least one clock cycle.

Figure 4:
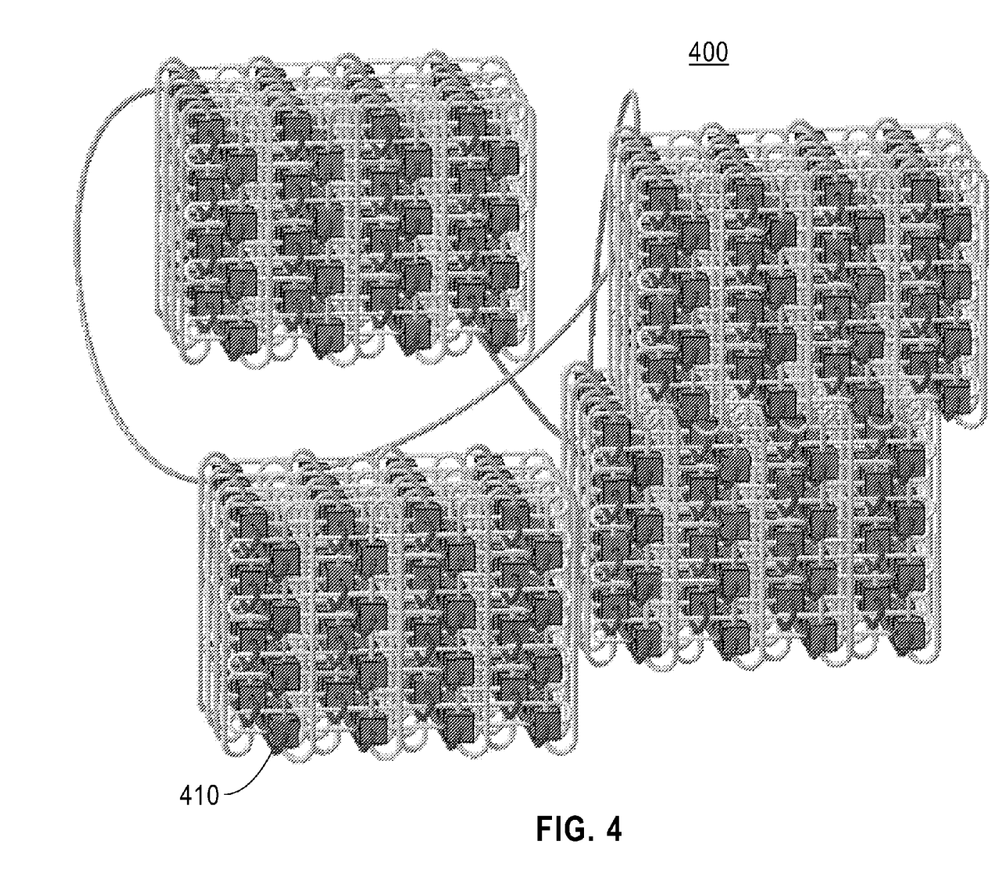
FIG. 4 illustrates 5-Dimensional torus network in one embodiment.

In a further embodiment, the collective logic device 260 is embedded and/or implemented in a 5-Dimensional torus network. FIG. 4 illustrates a 5-Dimensional torus network 400. A torus network is a grid network where a node is connected to at least two neighbors along one or more dimensions. The network 400 includes, without limitation, a plurality of computing nodes (e.g., a computing node 410). The network 400 may have at least 2 GB/s bandwidth. In a further embodiment, some or all of the computing nodes in the network 400 includes at least one collective logic device 260. The collective logic device 260 can operate at a peak bandwidth of the network 400.

Figure 1:
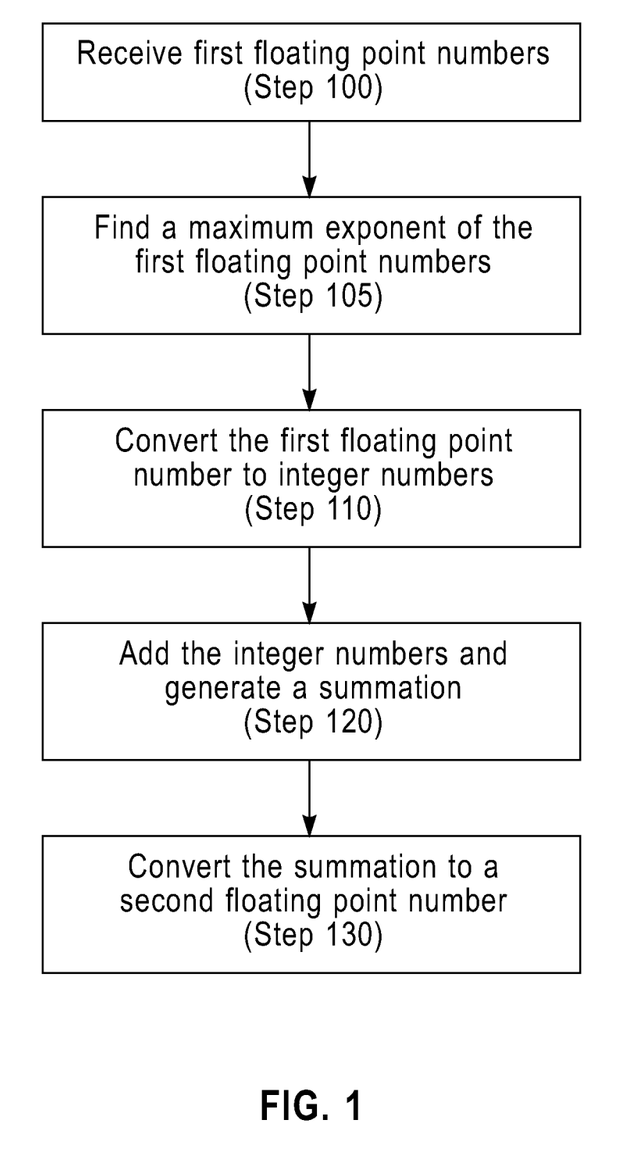
FIG. 1 illustrates a flow chart including method steps for adding a plurality of floating point numbers in one embodiment.

FIG. 1 illustrates a flow chart for adding a plurality of floating point numbers in a parallel computing system. The parallel computing system may include a plurality of computing nodes. A computing node may include, without limitation, at least one processor and/or at least one memory device. At step 100 in FIG. 1, the collective logic device 260 receives the inputs 200 which include a plurality of floating point numbers ("first floating point numbers") from computing nodes or network links. At step 105, the FP exponent max unit 220 finds a maximum exponent (i.e., the largest exponent) of the first floating point numbers, e.g., by comparing exponents of the first floating point numbers. The FP exponent max unit 220 broadcast the maximum exponent to the computing nodes. At step 110, the front-end floating point logic device 270 converts the first floating point numbers to integer numbers, e.g., by performing left shifting and/or right shifting the first floating point numbers according to differences between exponents of the first floating point numbers and the maximum exponent. Then, the front-end floating point logic device 270 sends the integer numbers to the ALU tree 230 which includes integer adders (e.g., an adder 280). When sending the integer numbers, the front-end floating point logic device 270 may also send extra bits representing plus (+)infinity, minus (−)infinity and/or a not-a-number (NAN). NAN indicates an invalid operation and may cause an exception.

At step 120, the ALU tree 230 adds the integer numbers and generates a summation of the integer values. Then, the ALU tree 230 provides the summation to the back-end floating point logic device 240. At step 130, the back-end logic device 240 converts the summation to a floating point number ("second floating point number"), e.g., by performing left shifting and/or right shifting according to the maximum exponent and/or the summation. The second floating point number is an output of adding the inputs 200. This second floating point number is reproducible. In other words, upon receiving same inputs, the collective logic device 260 produces same output(s). The outputs do not depend on an order of the inputs.

Since an addition of integer numbers (converted from the floating point numbers) does not generate a different output based on an order of the addition, the collective logic device 260 generates the same output(s) upon receiving same inputs regardless of an order of the received inputs.

In one embodiment, the collective logic device 260 performs the method steps 100-130 in one pass. One pass refers that the computing nodes sends the inputs 200 only once to the collective logic device 260 and/or receives the output(s) only once from the collective logic device 260.

In a further embodiment, in each computing node, besides at least 10 bidirectional links for the 5D torus network 400, there is also at least one dedicated I/O link that is connected to at least one I/O node. Both the I/O link and the bidirectional links are inputs to the collective logic device 260. In one embodiment, the collective logic device 260 has at least 12 inputs. One or more of the inputs may come from a local computing node(s). In another embodiment, the collective logic device 260 has at most 12 inputs. One or more of the inputs may come from a local computing node(s).

In a further embodiment, at least one computing node defines a plurality of collective class maps to select a set of inputs for a class. A class map defines a set of input and output links for a class. A class represents an index into the class map on at least one computing node and is specified, e.g., by at least one packet.

In another embodiment, the collective logic device 260 performs the method steps 100-130 in at least two passes, i.e., the computing nodes sends (intermediate) inputs at least twice to the collective logic device 260 and/or receives (intermediate) outputs at least twice from the collective logic device 260. For example, in the first pass, the collective logic device 260 obtains the maximum exponent of the first floating point numbers. Then, the collective logic device normalizes the first floating point numbers and converts them to integer numbers. In the second pass, the collective logic device 260 adds the integer numbers and generates a summation of the integer numbers. Then, the collective logic device 260 converts the summation to a floating point number called the second floating point number. When the collective logic device 260 operates based on at least two passes, its latency may be at least twice larger than a latency based on one pass described above.

In one embodiment, the collective logic device 260 performing method steps in FIG. 1 is implemented in hardware or reconfigurable hardware, e.g., FPGA (Field Programmable Gate Array) or CPLD (Complex Programmable Logic deviceDevice), using a hardware description language (Verilog, VHDL, Handel-C, or System C). In another embodiment, the collective logic device 260 is implemented in a semiconductor chip, e.g., ASIC (Application-Specific Integrated Circuit), using a semi-custom design methodology, i.e., designing a chip using standard cells and a hardware description language. Thus, the hardware, reconfigurable hardware or the semiconductor chip may operate the method steps described in FIG. 1. In one embodiment, the collective logic device 260 is implemented in a processor (e.g., IBM® PowerPC® processor, etc.) as a hardware unit.

Following describes an exemplary floating point number addition according to one exemplary embodiment. Suppose that the collective logic device 260 receives two floating point numbers $A=2^1*1.5_{10}=3_{10}$ and $B=2^3*1.25_{10}=10_{10}$ as inputs. The collective logic device 260 adds the number A and the number B as follows:

I. (corresponding to Step 105 in FIG. 1) The collective logic device 260 obtains the maximum exponent, e.g., by comparing exponent fields of each input. In this example, the maximum exponent is 3.

II. (corresponding to Step 110 in FIG. 1) A floating point representation for the number A is 0x0018000000000000 (in hexadecimal notation)=$1.1_2 \times 2^1$. A floating point representation for the number B is 0x0034000000000000=$1.01_2 \times 2^3$. The collective logic device 260 converts the floating point representations to integer representations as follows:

Remove the exponent field and sign bit in the floating point representations. Append a hidden bit (e.g., "1") in front of the mantissa field of the floating point representations.

Regarding the floating point number with the maximum exponent, shift left the mantissa field, e.g., by 6 bits. In this example, the floating point representation for the number B is converted to 0x0500000000000000 after steps a-b.

Regarding other floating point numbers, shift left the mantissa field, e.g., 6—the maximum exponent+their exponents. (Left-shifting by "x," where x is less than zero, is equivalent to right-shifting by |x|.) In this example, the floating point representation for the number A is converted to 0x0180000000000000 after left shifting by 4 bits, i.e., 6-3+1 bits.

Thus, when the number A is converted to an integer number, it becomes 0x0180000000000000. When the number B is converted, it becomes 0x0500000000000000. Note that the integer numbers comprise only the mantissa field. Also note that the most significant bit of the number B is two binary digits to the left (larger) than the most significant bit of the number A. This is exactly the difference between the two exponents (1 and 3).

III. (corresponding to Step 120 in FIG. 1) The two integer numbers are added. In this example, the result is 0x0680000000000000=0x0180000000000000+0x0500000000000000.

IV. (corresponding to Step 130 in FIG. 1) This result is then converted back to a floating point representation, taking into account the maximum exponent which has been passed through the collective logic device 260 in parallel with the addition as follows:

Right shift the result, e.g., by 6 bits.

Remove the hidden bit.

Append a new exponent in the exponent field. The new exponent is calculated, e.g., by New exponent=the maximum exponent+4—leading bit number which is 1 in bit (0 to 3). In this example, the leading bit number is 4.

In this example, after steps 1-3, 0x0680000000000000 is converted to 0x003a000000000000=$2^3 * 1.625_{10} = 13_{10}$, which is expected by adding $10_{10}$ and $3_{10}$.

In one embodiment, the collective logic device 260 performs logical operations including, without limitation, logical AND, logical OR, logical XOR, etc. The collective logic device 260 also performs integer operations including, without limitation, an unsigned and signed integer addition, min and max with an operand size from 32 bits to 4096 bits in units of $(32*2^n)$ bits, where n is a positive integer number. The collective logic device 260 further performs floating point operations including, without limitation, a 64-bit floating point addition, min (i.e., finding a minimum floating point number among inputs) and max (finding a maximum floating point number among inputs). In one embodiment, the collective logic device 260 performs floating point operations at a peak network link bandwidth of the network.

In one embodiment, the collective logic device 260 performs a floating point addition as follows: First, some or all inputs are compared and the maximum exponent is obtained. Then, the mantissa field of each input is shifted according to the difference of its exponent and the maximum exponent. This shifting of each input results in a 64-bit integer number which is then passed through the integer ALU tree 230 for doing an integer addition. A result of this integer addition is then converted back to a floating point number, e.g., by the back-end logic device 240.

Figure 3:
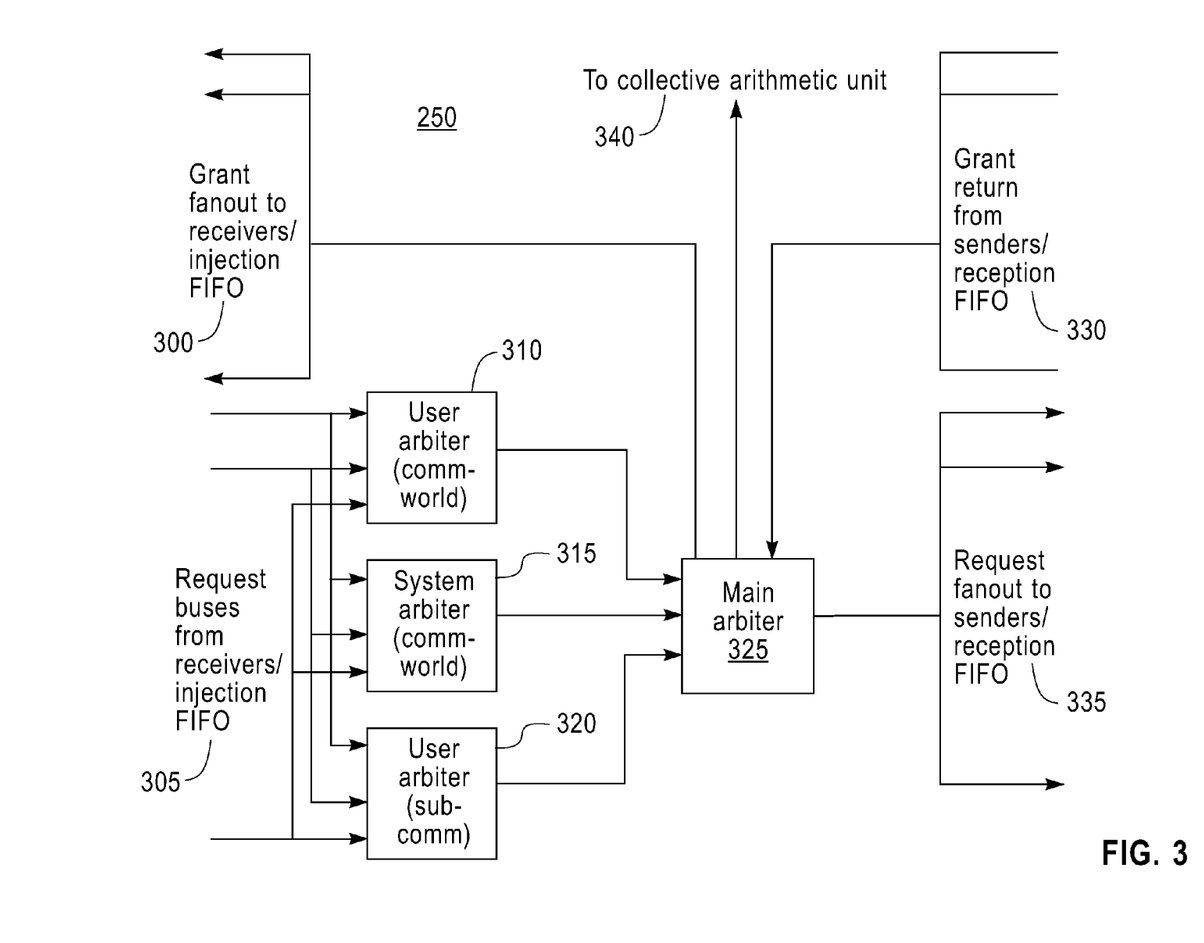
FIG. 3 illustrates a system diagram of an arbiter in one embodiment.

FIG. 3 illustrates an arbiter device 250 in one embodiment. The arbiter device 250 controls and manages the collective logic device 260, e.g., by setting configuration bits for the collective logic device 260. The configuration bits define, without limitation, how many FP shifters (e.g., an FP shifter 210) are used to convert the inputs 200 to integer numbers, how many adders (e.g., an adder 280) are used to perform an addition of the integer numbers, etc. In this embodiment, an arbitration is done in two stages: first, three types of traffic (user 310/system 315/subcomm 320) arbitrate among themselves; second, a main arbiter 325 chooses between these three types (depending on which have data ready). The "user" type 310 refers to a reduction of network traffic over all or some computing nodes. The "system" type 315 refers to a reduction of network traffic over all or some computing nodes while providing security and/or reliability on the collective logic device. The "subcomm" type 320 refers to a rectangular subset of all the computing nodes. However, the number of traffic types is not limited to these three traffic types. The first level of arbitration includes a tree of 2-to-1 arbitrations. Each 2-to-1 arbitration is round-robin, so that if there is only one input request, it will pass through to a next level of the tree 240, but if multiple inputs are requesting, then one will be chosen which was not chosen last time. The second level of the arbitration is a single 3-to-1 arbiter, and also operates a round-robin fashion.

Once input requests has been chosen by an arbiter, those input requests are sent to appropriate senders (and/or the reception FIFO) 330 and/or 350. Once some or all of the senders grant permission, the main arbiter 325 relays this grant to a particular sub-arbiter which has won and to each receiver (e.g., an injection FIFO 300 and/or 305). The main arbiter 325 also drives correct configuration bits to the collective logic device 260. The receivers will then provide their input data through the collective logic device 260 and an output of the collective logic device 260 is forwarded to appropriate sender(s).

Integer Operations

In one embodiment, the ALU tree 230 is built with multiple levels of combining blocks. A combining block performs, at least, an unsigned 32-bit addition and/or 32-bit comparison. In a further embodiment, the ALU tree 230 receives control signals for a sign (i.e., plus or minus), an overflow, and/or a floating point operation control. In one embodiment, the ADD tree 230 receives at least two 32-bit integer inputs and at least one carry-in bit, and generates a 32-bit output and a carry-out bit. A block performing a comparison and/or selection receives at least two 32-bit integer inputs, and then selects one input depending on the control signals. In another embodiment, the ALU tree 230 operates with 64-bit integer inputs/outputs, 128-bit integer inputs/outputs, 256-bit integer inputs/outputs, etc.

Floating Point Operations

In one embodiment, the collective logic device 260 performs 64-bit double precision floating point operations. In one embodiment, at most 12 (e.g., 10 network links+1 I/O link+1 local computing node) floating point numbers can be combined, i.e., added. In an alternative embodiment, at least 12 floating point number are added.

A 64-bit floating point number format is illustrated in Table 2.

TABLE 2

IEEE double precision floating point number format

| Signed (S) | Exponent (E) | Mantissa (M) | |
|---|---|---|---|
| 0 | 1 | 11  12 | 63 |

In IEEE double precision floating point number format, there is a signed bit indicating whether a floating point number is an unsigned or signed number. The exponent field is 11 bits. The mantissa field is 52 bits.

In one embodiment, Table 3 illustrates a numerical value of a floating point number according to an exponent field value and a mantissa field value:

TABLE 3

Numerical Values of Floating Point Numbers

| Exponent field binary | Exponent field value | Exponent (E) | Value |
|---|---|---|---|
| 11...11 | 2047 | | If M = 0, +/−Infinity<br>If M != 0, NaN |
| Non zero | 1 to 2046 | −1022 to 1023 | $(-1)^S * 1.M * 2^E$ |
| 00...00 | 0 | zero or denormalized numbers | +/−0, when x = 0;<br>$(-1)^S * 0.M * 2^{(-1022)}$ |

If the exponent field is 2047 and the mantissa field is 0, a corresponding floating point number is plus or minus Infinity. If the exponent field is 2047 and the mantissa field is not 0, a corresponding floating point number is NaN (Not a Number). If the exponent field is between 1 and $2046_{10}$, a corresponding floating point number is $(-1)^S \times 0.M \times 2^E$. If the exponent field is 0 and the mantissa field is 0, a corresponding floating point number is 0. If the exponent field is 0 and the mantissa field is not 0, a corresponding floating point number is $(-1)^S \times 0.M \times 2^{-1022}$. In one embodiment, the collective logic device 260 normalizes a floating point number according to Table. 3. For example, if S is 0, E is $2_{10}=10_2$ and M is 1000_0000_0000_ 0000_0000_0000_0000_0000_0000_0000_0000_ 0000_0000$_2$, a corresponding floating number is normalized to 1.1000 . . . 0000×2$^2$.

In one embodiment, an addition of (+)infinity and (+)infinity generates (+)infinity, i.e., (+)Infinity+(+)Infinity=(+)Infinity. An addition of (−)infinity and (−)infinity generates (−)infinity, i.e., (−)Infinity+(−)Infinity=(−)Infinity. An addition of (+)infinity and (−)infinity generates NaN, i.e., (+)Infinity+(−)Infinity=NaN. Min or Max operation for (+)infinity and (+)infinity generates (+)infinity, i.e., MIN/MAX (+Infinity, +Infinity)=(+)infinity. Min or Max operation for (−)infinity and (−)infinity generates (−)infinity, i.e., MIN/MAX (−Infinity, −Infinity)=(−)infinity.

In one embodiment, the collective logic device 260 does not distinguish between different NaNs. An NaN newly generated from the collective logic device 260 may have the most significant fraction bit (the most significant mantissa bit) set, to indicate NaN.

Floating Point (FP) Min and Max

In embodiment, an operand size in FP Min and Max operations is 64 bits. In another embodiment, an operand size in FP Min and Max operations is larger than 64 bits. The operand passes through the collective logic device 260 without any shifting and/or normalization and thus reduces an overhead (e.g., the number of clock cycles to perform the FP Min and/or Max operations). Following describes the FP Min and Max operations according to one embodiment. Suppose that "I" be an integer representation (i.e., integer number) of bit patterns for 63 bits other than the sign bit. Given two floating point numbers A and B, if (Sign(A)=0 and Sign(B)=0, or both positive) then
   if (I(A)>I(B)), then A>B.
(If both A and B are positive numbers and if A's integer representation is larger than B's integer representation, A is larger than B.)
if (Sign(A)=0, and Sign(B)=1), then A>B.
(If A is a positive number and B is a negative number, A is larger than B.)
if (Sign(A)=1 and Sign(B)=1, both negative) then
   if (I(A)>I(B)), then A<B.
(If both A and B are negative numbers and if A's integer representation is larger than B's integer representation (i.e., |A|>|B|), A is smaller than B.)

Floating Point ADD

In one embodiment, operands are 64-bit double precision Floating point numbers. In one embodiment, the operands are 32 bits floating point numbers, 128 bits floating point numbers, 256 bits floating point numbers, 256 bits floating point numbers, etc. There is no reordering on injection FIFOs 300-305 and/or reception FIFOs 330-335.

In one embodiment, when a first half of the 64-bit floating point number is received, the exponent field of the floating point number is sent to the FP exponent max unit 220 to get the maximum exponent for some or all the floating point numbers contributing to an addition of these floating point numbers. The maximum exponent is then used to convert each 64-bit floating point numbers to 64-bit integer numbers. The mantissa field of each floating point numbers has a precision of 53 bits, in the form of 1.x for regular numbers, and 0.x for denormalized numbers. The converted integer numbers reserve 5 most significant bits, i.e., 1 bit for a sign bit and 4 bits for guarding against overflow with up to 12 numbers being added together. The 53-bits mantissa field is converted into a 64-bit number in the following way. The left most 5 bits are zeros. The next bit is one if the floating point number is normalized and it is zero if the floating point number is denormalized. Next, the 53-bit mantissa field is appended and then 6 zeroes are appended. Finally, the 64-bit number is right-shifted by Emax−E, where Emax is the maximum exponent and E is a current exponent value of the 59-bit number. E is never greater than Emax, and so Emax−E is zero or positive. After this conversion, if the sign bit retained from the 64-bit floating point number, then the shifted number ("N") is converted to 2's complementary format ("N_new"), e.g., by N_new=(not N)+1, where "not N" may be implemented by a bitwise inverter. A resulting number (e.g., N_new or N) is then sent to the ALU tree 230 with a least significant 32-bit word first. In a further embodiment, there are additional extra control bits to identify special conditions. In one embodiment, each control bit is binary. For example, if the NaN bit is 0, then it is not a NaN, and if it is 1, then it is a NaN. There are control bits for +Infinity and −Infinity as well.

The resulting numbers are added as signed integers with operand sizes of 64 bits, with a consideration to control bits for Infinity and NaN. A result of the addition is renormalized to a regular floating point format: (1) if a sign bit is set (i.e., negative sum), covert the result back from 2's complementary format using, .e.g., K_new=not (K−1), where K_new is the converted result and K is the result before the converting; (2)

Then, right or left shift K or K_new until the left-most bit of the final integer sum (i.e., an integer output of the ALU 230) which is a '1' is in the $12^{th}$ bit position from the left of the integer sum. This '1' will be a "hidden" bit in the second floating point number (i.e., a final output of adding of floating point numbers). If the second floating point number is a denormalized number, shift right the second floating point number until the left-most '1' is in the $13^{th}$ position, and then shift to the right again, e.g., by the value of the maximum exponent. The resultant exponent is calculated as Emax+the amount it was right-shifted−6, for normalized floating point results. For denormalized floating point results, the exponent is set to the value according to the IEEE specification. A result of this renormalization is then sent on with most significant 64-bit word to computing nodes as a final result of the floating point addition.

Although the embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and run, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to affect one or more functions of this invention. Furthermore, the present invention may be implemented as a program storage device readable by machine, tangibly embodying a program of instructions executable by the machine to perform method steps for causing one or more functions of this invention.

The present invention may be implemented as a computer readable medium (e.g., a compact disc, a magnetic disk, a hard disk, an optical disk, solid state drive, digital versatile disc) embodying program computer instructions (e.g., C, C++, Java, Assembly languages, .Net, Binary code) run by a processor (e.g., Intel® Core™, IBM® PowerPC®) for causing a computer to perform method steps of this invention. The present invention may include a method of deploying a computer program product including a program of instructions in a computer readable medium for one or more functions of this invention, wherein, when the program of instructions is run by a processor, the compute program product performs the one or more of functions of this invention. The present invention may also include a computer program product for one or more functions of this invention. The computer program product includes a storage medium (e.g., a disk, optical disc, memory device, solid-state drive, etc.) readable by a processing circuit and storing instructions run by the processing circuit for performing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A parallel computing system for adding a plurality of first floating point numbers, the system comprising:
    a plurality of computing nodes, a computing node including at least one processor and at least one memory device; and
    a collective logic device including:
        a front-end logic device for receiving a plurality of the first floating point numbers in parallel from the computing nodes or network links and for converting the first floating point numbers to a plurality of integer numbers, said front-end logic device further for comparing exponents of each of the first floating point numbers to determine a maximum exponent;
        an ALU comprising a plurality of levels with combining blocks for adding the integer numbers in parallel and generating a summation of all of the plurality of integer numbers in one pass; and
        a back-end logic device for converting the summation to a second floating point number by performing shifting according to the maximum exponent,
    wherein the receiving, the converting the first floating point numbers, the adding, the generating and the converting the summation are performed in one pass in which the computing nodes send the plurality of first floating point numbers only once to the collective logic device and receive the second floating point number only once from the collective logic device.

2. The system according to claim 1, wherein the front-end logic device comprises at least one shift register for shifting the first floating point numbers according to differences between the exponents of the first floating numbers and the maximum exponent.

3. The system according to claim 2, wherein the back-end logic device comprises at least one shift register for shifting the second floating point number according to the maximum exponent and the summation.

4. The system according to claim 1, wherein the collective logic device is implemented in a network.

5. The system according to claim 4, wherein one or more of the computing nodes comprises the collective logic device.

6. The system according to claim 5, wherein the collective logic device receives the plurality of the first floating point numbers from torus links, an I/O link and the computing nodes.

7. The system according to claim 5, wherein the collective logic device produces the second floating point number at a peak network link bandwidth of the network.

8. The system according to claim 1, wherein the computing nodes defines at least one class map, the at least one class map defining a set of input and output links for a class, the class representing an index into the class map on the computing nodes and being specified by at least one packet.

9. The system according to claim 4, wherein the second floating point number is reproducible.

10. A parallel computing system for adding a plurality of first floating point numbers, the system comprising:
- a plurality of computing nodes, a computing node including at least one processor and at least one memory device;
- a collective logic device including:
  - a front-end logic device for receiving a plurality of the first floating point numbers in parallel from the computing nodes or network links and for converting the first floating point numbers to integer numbers;
  - an ALU comprising a plurality of levels with combining blocks for adding the integer numbers in parallel and generating a summation of the integer numbers;
  - a back-end logic device for converting the summation to a second floating point number; and
- an arbiter device for providing configuration bits to the collective logic device, the arbiter device including:
  - a main arbiter;
  - a user arbiter for a first traffic type of reducing network traffic over at least one computing node;
  - a system arbiter for a second traffic type of reducing the network traffic over at least one computing node and providing security on the collective logic device;
  - a subcomm arbiter for a third traffic type of a rectangular subset of the plurality of computing nodes;
  - at least one reception FIFO; and
  - at least one injection FIFO,
- wherein the main arbiter arbitrates among the first, second and third traffic types, and chooses an input request from one of the first, second and third traffic types, and when the input request is chosen, the main arbiter sends the chosen input request to at least one of the reception FIFO for permission, and when the at least one of the reception FIFO grants permission, the main artiber sends the permitted input request to a particular sub-arbitrator and to at least one injection FIFO.

* * * * *